United States Patent [19]

Martin

[11] Patent Number: 5,111,058
[45] Date of Patent: May 5, 1992

[54] CIRCUIT FOR SUSTAINING POWER SUPPLY OUTPUT FOLLOWING MOMENTARY INTERRUPTION OF COMMERCIAL A.C. POWER

[76] Inventor: Richard A. Martin, 14981 E. Elk Pl. 98-8, Denver, Colo. 80239

[21] Appl. No.: 527,272

[22] Filed: May 23, 1990

[51] Int. Cl.5 .......................... H02J 9/06; G11C 14/00
[52] U.S. Cl. .......................... 307/66; 307/46; 307/109; 365/229
[58] Field of Search .................... 307/109, 110, 64, 66, 307/65, 46, 48, 49; 365/226, 227, 229; 320/5, 8, 10, 13, 14, 20

[56] References Cited

U.S. PATENT DOCUMENTS

| | | | |
|---|---|---|---|
| 4,316,133 | 2/1982 | Locke, Jr. ........................... | 320/48 |
| 4,685,120 | 8/1987 | Norris et al. ....................... | 307/632 |
| 4,795,914 | 1/1989 | Higa et al. ......................... | 307/64 |
| 4,810,936 | 3/1989 | Nuckolls et al. ................... | 315/119 |
| 4,930,036 | 5/1990 | Sitch .................................. | 361/56 |
| 4,956,584 | 9/1990 | Sikora ................................ | 315/241 R |
| 4,962,354 | 10/1990 | Visser et al. ...................... | 323/360 |

Primary Examiner—A. D. Pellinen
Assistant Examiner—Richard Elms
Attorney, Agent, or Firm—William E. Hein

[57] ABSTRACT

Circuitry for extending the sustain time of a computer power supply in the event of interruption of commercial A.C. power includes a capacitor bank, an associated charge path for controllably charging the capacitor bank during stable operation of the commercial A.C. power source, and discharge and disconnect paths for discharging the energy stored in the capacitor bank to sustain operation of the computer during interruption of the commercial A.C. power source and for disconnecting the capacitor from the computer power supply when the voltage across the capacitor bank has discharged below a threshold level.

3 Claims, 1 Drawing Sheet 5,111,058

CIRCUIT FOR SUSTAINING POWER SUPPLY OUTPUT FOLLOWING MOMENTARY INTERRUPTION OF COMMERCIAL A.C. POWER

BACKGROUND AND SUMMARY OF THE INVENTION

This invention relates generally to D.C. power supplies of the type commonly used in personal computers, for example, to convert commercially available A.C. line voltage to one or more regulated D.C. voltage sources for powering the circuitry of the personal computer. More particularly, the present invention is directed to a circuit for sustaining the operation of such power supplies in the event of a momentary power interrupion on the commercial A.C. line to which the computer or other electronic apparatus is connected. By nature, commercial A.C. line voltage is not entirely stable, for a variety of reasons well understood by those persons having ordinary skill in the art. Power interruptions of various durations are a well documented fact of today's commercial power sources, and a substantial body of prior art is directed to solutions to this problem. The most typical prior art solutions to the problem of power interruption are to install large saturable reactors or large and expensive battery-based uninterruptable power supplies that basically serve as a standby power source in the event of longer term power interruptions. Statistically, however, over 93% of commercial power interruptions are 1 second or less in duration. These seemingly insignificant interruptions can cause data loss and other serious problems in computer systems and other electronic apparatus.

It is therefore a principal object of the present invention to provide circuitry for sustaining the output of a power supply for computers and other electronic apparatus in the event of a momentary interruption in the commercial A.C. power source. It is a further object of the present invention to provide such circuitry in a configuration that is inexpensive and that may be easily added to existing personal computer power supplies. These and other objects are accomplished in accordance with the illustrated embodiment of the present invention by providing a capacitor bank and associated charge path, discharge path, and disconnect circuitry connected across the raw D.C. voltage source internal to a personal computer that is derived by rectifying and filtering the commercial A.C. line voltage powering the personal computer. During stable operation of the commercial A.C. power source the integrated capacitor bank is maintained in a charged condition. When an interruption occurs in the commercial A.C. power source, the energy stored in the capacitor bank is discharged to maintain the raw D.C. voltage source and to thereby sustain operation of the computer for up to one second while the commercial A.C. power source stabilizes.

DETAILED DESCRIPTION OF THE INVENTION

Figure 1:
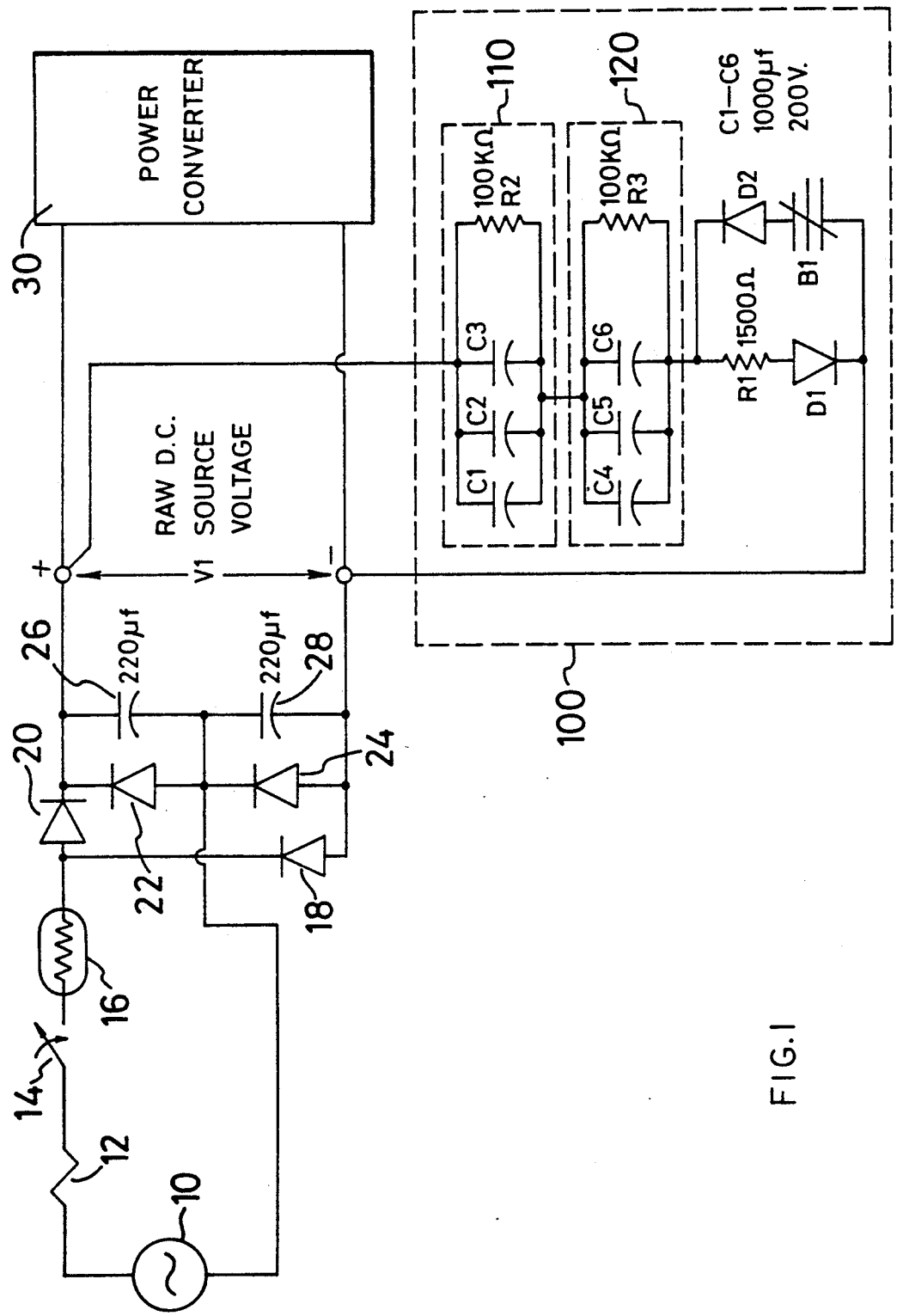
FIG. 1 is a detailed schematic diagram illustrating the line input portion of a power supply typically employed in personal computers and other electronic apparatus, together with the circuitry of the present invention that serves to sustain the ouptut of the power supply in the event of a momentary loss of commercial A.C. line power.

Power supplies are required in personal computers and other electronic products to convert the commercial A.C. line voltage to various regulated D.C. voltages required for powering the internal circuitry of such computers and other electronic products. Typical of such power supplies are so-called switching power supplies that employ a rectifier/filter section to derive a raw D.C. source voltage from the commercial A.C. line voltage, a power converter section for converting the raw D.C. source voltage to one or more desired D.C. voltages, and a regulator section for providing voltage and current regulation of the one or more desired D.C. voltages.

Referring now to FIG. 1, a source of 110/220-volt commercial power 10 is applied, through a fuse 12, a power switch 14, and an in-rush current limiting thermistor 16, to a full-wave voltage doubler rectifier that comprises diodes 18, 20, 22, 24 and filter capacitors 26, 28 to produce a raw D.C. source voltage V1. The raw D.C. source voltage V1 is applied to a conventional power converter 30. A conventional regulator circuit, not illustrated, may be connected to the output of power converter 30. The sustain time, or the ability of a power supply to maintain its output voltage within certain limits in the event of interruption of the commercial A.C. power source, is directly related to the value of the filter capacitors 26, 28. Switching power supplies of the type in general use in the personal computer industry typically employ filter capacitors in the range of 100–1000 microfarads to produce a sustain time of approximately 4–167 milliseconds. In spite of the direct relationship between filter capacitance and sustain time, it is not possible to increase the sustain time of the power supply by simply increasing the value of the filter capacitors 26, 28 because such an increase to a value much beyond 1000 microfarads will severely affect the performance characteristics of the power supply. For example, the inrush current, or the current required to initially charge those capacitors, will increase to destructive levels. Even if it were feasible to select components capable of withstanding high levels of inrush current, the delayed startup of the power converter 30 would become a problem because it is not possible to provide the current required by the power converter 30 and the additional filter capacitance rapidly enough to insure proper operation of the power converter. It has been found that applying power to a personal computer connected to a standard 20-ampere 115-volt circuit will literally "dim the lights" if an additional capacitance of 2000 microfarads is connected across the filter capacitors 26, 28 of the personal computer power supply in an attempt to thereby extend the sustain time of the power supply. Furthermore, the additional filter capacitance will slow turn-off of the computer, thereby giving rise to the possibility of turn-off voltage spikes that may cause errors in associated data storage devices.

In order to extend the sustain time of the personal computer power supply, the circuitry 100 of the present invention is simply connected across the raw D.C. voltage source V1 provided by the full-wave voltage doubler rectifier, as illustrated in FIG. 1. The circuitry 100 comprises the series connection of two capacitor banks 110, 120. Capacitor bank 110 comprises the Parallel connection of capacitors C1, C2, C3 and a bleeder resistor R2. Each of the capacitors C1, C2, C3 is preferably a 1000 microfarad, 200-volt electrolytic to minimize the overall physical size of the circuitry 100. Similarly, capacitor bank 120 comprises the parallel connection of capacitors C4, C5, C6 and a bleeder resistor R3. Bleeder resistors R2 and R3 are primarily employed to balance the voltage between capacitor banks 110, 120 and may therefore have high values of resistance. A resistor R1 and a diode D1 are connected in series with capacitor banks 110, 120. Resistor RI controls the charging rate of the capacitors comprising capacitor banks 110, 120 to be relatvely slow compared to the charging rates of power supply filter capacitors 26, 28 to thereby limit the inrush current. Diode D1 operates to isolate the capacitor banks 110, 120 from power converter 30. A series combination of a diode D2 and a break-over device B1 are connected in parallel with the series combination of resistor R1 and diode D1 to provide a discharge path for capacitor banks 110 120. When the source of commercial A.C. power 10 is interrupted for any reason, capacitor banks 110, 120 are discharged to provide momentary continued operation of power converter 30. When the filter capacitors 26, 28 of the computer power supply discharge to a voltage that is 135 volts below the voltage across capacitor banks 110, 120, break-over device BI, which may comprise a commercially available sidac nigh voltage bilateral trigger, avalanches into full conduction. Alternatively, break-over device B1 may comprise a silicon controlled rectifier, requiring additional gate circuitry that is not required of a sidac bilateral trigger. Diode D2 insures that break-over device B1 will avalanche only when the voltage across resistor R1 reverses polarity, which occurs when capacitor banks 110, 120 begin to discharge. Break-over device B1 disconnects the capacitor banks 110, 120 from the power converter 30 when the voltage across capacitor banks 110, 120 falls below the necessary level to maintain break-over device BI in conduction. Break-over device B1 further insures proper operation of power converter 30 until the voltage across capacitor banks 110, 120 falls below the threshold starting voltage of power converter 30.

The circuitry 100 of the present invention involves components whose physical sizes permits fabrication of the circuitry 100 on a printed circuit board of approximately four inches square. The board may then be conveniently mounted within the enclosure of existing personal computers to extend the sustain time of the computer power supply in the event of interruption of the commercial A.C. power source. Alternatively, the circuitry 100 may be integrated with the rest of the power supply circuitry for the computer.

I claim:

1. A power supply circuit for powering a load comprising computers in which the output voltage of the power supply circuit is sustained during a momentary interruption of a commercial A.C. power source, the power supply circuit comprising:
   full-wave voltage doubler rectifier/filter means coupled to the commercial A.C. power source for providing a raw D.C. source;
   power converter means coupled to said raw D.C. voltage source for converting said raw D.C. voltage source to one or more D.C. voltages used by the computer equipment;
   capacitor means, a charging resistor, and a charging diode connected in series, the series combination thereof being connected to said raw D.C. voltage source to provide a charging path for charging said capacitor means to a voltage corresponding to said raw D.C. voltage source during normal operation of the commercial A.C. power source; and
   a break-over device and a discharge diode connected in series, the series combination thereof being connected across the series combination of said charging resistor and said charging diode to provide a path for discharging said capacitor means to sustain operation of said powr converter means during momentary interruption of the commercial A.C. power source and to disconnect said capacitor means from said raw D.C. voltage source when said capacitor means has been discharged to a minimum level required to insure proper operation of said power converter means.

2. A power supply circuit as in claim 1 wherein said break-over device comprises a sidac bilateral trigger.

3. A power supply circuit as in claim 2 further comprising bleeder resistor means connected across said capacitor means.

* * * * *